United States Patent
Pugliese et al.

(10) Patent No.: US 10,197,189 B2
(45) Date of Patent: Feb. 5, 2019

(54) MEMBRANE MICROFLUIDIC VALVE AND PROCESS FOR MANUFACTURING A MEMBRANE MICROFLUIDIC VALVE

(71) Applicant: STMicroelectronics S.r.l., Agrate Brianza (IT)

(72) Inventors: Marco Pugliese, Maglie (IT); Francesco Ferrara, Monteroni di Lecce (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 199 days.

(21) Appl. No.: 14/289,298

(22) Filed: May 28, 2014

(65) Prior Publication Data

US 2014/0352819 A1    Dec. 4, 2014

(30) Foreign Application Priority Data

May 31, 2013   (IT) .............................. TO2013A0447

(51) Int. Cl.
*B01L 3/00*    (2006.01)
*F16K 99/00*    (2006.01)

(52) U.S. Cl.
CPC .... *F16K 99/0053* (2013.01); *B01L 3/502738* (2013.01); *F16K 99/0015* (2013.01); (Continued)

(58) Field of Classification Search
CPC ........... B01L 3/502738; F16K 99/0053; F16K 99/0015; F16K 99/0046; F16K 99/0003; F16K 99/0026
(Continued)

(56) References Cited

U.S. PATENT DOCUMENTS 4,848,722 A * 7/1989 Webster .................... F16K 7/17
137/613
5,932,799 A * 8/1999 Moles ............... B01L 3/502707
251/61.1
(Continued)

FOREIGN PATENT DOCUMENTS

EP   1 065 378 A2   1/2001
WO   2012/097233 A1   7/2012

OTHER PUBLICATIONS

Unger et al., "Monolithic Microfabricated Valves and Pumps by Multilayer Soft Lithography", Science AAS, vol. 288, www.sciencemag.org, Apr. 7, 2000, pp. 113-115, 5 pages.
(Continued)

*Primary Examiner* — Kevin Murphy
*Assistant Examiner* — Kelsey Cary
(74) *Attorney, Agent, or Firm* — Seed IP Law Group LLP (57) ABSTRACT

A microfluidic valve includes: a first structural layer and a second structural layer; a microfluidic circuit having a first microfluidic conduit and a second microfluidic conduit, which are defined in a superficial portion of the first structural layer, are adjacent, and are separated by a wall; a membrane set between the first structural layer and the second structural layer and delimiting the microfluidic circuit on one side; and a recess containing a gaseous fluid in the second structural layer. The membrane is movable in response to an actuation stimulus between a closed position, in which the first and second microfluidic conduits are fluidly decoupled, and an open position, in which the membrane is at least in part retracted into the recess and the first and second microfluidic conduits are fluidly coupled by means of a fluidic passage defined between the wall and the membrane.

20 Claims, 4 Drawing Sheets

(52) U.S. Cl.
CPC ....... *F16K 99/0046* (2013.01); *B01L 2200/12* (2013.01); *B01L 2300/0816* (2013.01); *B01L 2300/0874* (2013.01); *B01L 2300/0887* (2013.01); *B01L 2400/043* (2013.01); *B01L 2400/0487* (2013.01); *B01L 2400/0638* (2013.01); *B01L 2400/0655* (2013.01); *F16K 99/0003* (2013.01); *F16K 99/0026* (2013.01); *Y10T 137/85978* (2015.04)

(58) Field of Classification Search
USPC .......................... 251/335.2, 61, 61.1, 129.06
See application file for complete search history.

(56) References Cited

U.S. PATENT DOCUMENTS

| | | | | |
|---|---|---|---|---|
| 6,116,863 | A | 9/2000 | Ahn et al. | |
| 6,189,858 | B1* | 2/2001 | Miyazoe | F16K 15/185 251/129.06 |
| 2002/0185184 | A1* | 12/2002 | O'Connor | B01F 5/0471 137/822 |
| 2003/0116738 | A1* | 6/2003 | O'Connor | F15C 5/00 251/129.14 |
| 2003/0196695 | A1 | 10/2003 | O'Connor et al. | |
| 2004/0115838 | A1* | 6/2004 | Quake | B01D 57/02 436/538 |
| 2006/0027777 | A1* | 2/2006 | Koeneman | F16K 11/074 251/205 |
| 2006/0131530 | A1* | 6/2006 | East | F04B 43/046 251/129.06 |
| 2010/0266432 | A1* | 10/2010 | Pirk | F04B 43/043 417/472 |
| 2010/0303687 | A1* | 12/2010 | Blaga | B01L 3/50273 422/504 |

OTHER PUBLICATIONS

Kaigala et al., "Electrically controlled microvalves to integrate microchip polymerase chain reaction and capillary electrophoresis", The Royal Society of Chemistry, wwww.rsc.org/loc, Jun. 5, 2008, pp. 1071-1078, 9 pages.

Cheng et al., "A Transcutaneous Controlled Magnetic Microvalve Based on Iron-Powder Filled PDMS for Implantable Drug Delivery Systems", Proceedings of the 3rd IEEE Int. Conf. on Nano/Micro Engineered and Molecular Systems, Jan. 6-9, 2008, pp. 1160-1163.

* cited by examiner

MEMBRANE MICROFLUIDIC VALVE AND PROCESS FOR MANUFACTURING A MEMBRANE MICROFLUIDIC VALVE

BACKGROUND

Technical Field

The present disclosure relates to a membrane microfluidic valve and to a process for manufacturing a membrane microfluidic valve.

Description of the Related Art

Various types of microfluidic valves are known, which are used in microfluidic devices. In particular, passive microfluidic valves are known that are operated exclusively by differences of pressure and may be used, for example, as non-return valves or one-way valves, and controlled microfluidic valves, which may be opened or closed by dedicated actuators in a way largely independent of the pressure conditions.

Microfluidic valves may be used in microfluidic circuits and devices in various sectors, for example for producing microreactors, systems for biochemical analyses, inkjet printing heads.

The structure of microfluidic valves, and especially of controlled microfluidic valves, is frequently somewhat complex and may involve problems in terms of reliability, as well as high manufacturing costs.

One of the aspects that involves greater problems is typically the integration of microchannels and of mobile members, for operation, within the microstructure that forms the valve body. Frequently, complex operations of micromachining are desired or, alternatively, different portions of the device are made using different molds in many distinct substrates, which are then bonded. In the latter case, it is by no means rare for difficulties to arise also as regards proper alignment of the various substrates.

The problem of the complexity of production is particularly, if not exclusively, felt in controlled microfluidic valves, so that also actuator devices are to be provided.

BRIEF SUMMARY

One or more embodiments of the present disclosure are directed to a membrane microfluidic valve and a process for manufacturing a membrane microfluidic valve.

According to one embodiment of the present disclosure, a membrane microfluidic valve comprises a first structural layer and a second structural layer bonded to the first structural layer. The valve further includes a microfluidic circuit including an active region and first and second microfluidic conduits that are at least partially defined in the first structural layer and are adjacent in the active region. The microfluidic circuit further includes a wall in the active region that separates the first microfluidic conduit from the second microfluidic conduit. The valve further includes a recess in the second structural layer in the active region. The recess may contain a gaseous fluid. The valve further includes a membrane arranged between the first structural layer and the second structural layer and delimiting a portion of the microfluidic circuit in the active region. The membrane is moveable in response to an actuation stimulus between a closed position in which the first microfluidic conduit is fluidly decoupled from the second microfluidic conduit and an open position in which the membrane is at least in part retracted in the recess and places the first microfluidic conduit in fluid communication with the second microfluidic conduit.

BRIEF DESCRIPTION OF THE SEVERAL VIEWS OF THE DRAWINGS

For a better understanding of the disclosure, some embodiments thereof will now be described purely by way of non-limiting example with reference to the attached drawings, wherein.

DETAILED DESCRIPTION

Figure 1:
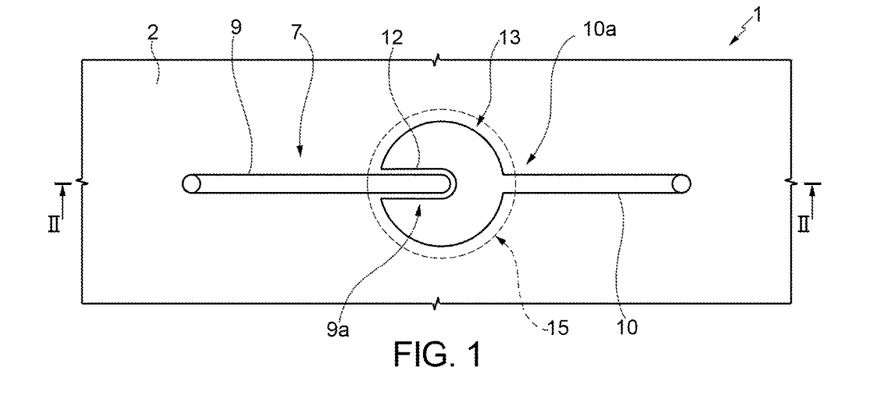
FIG. 1 is a top plan view, with parts removed for clarity, of a microfluidic valve according to one embodiment of the present disclosure.
Figure 2:
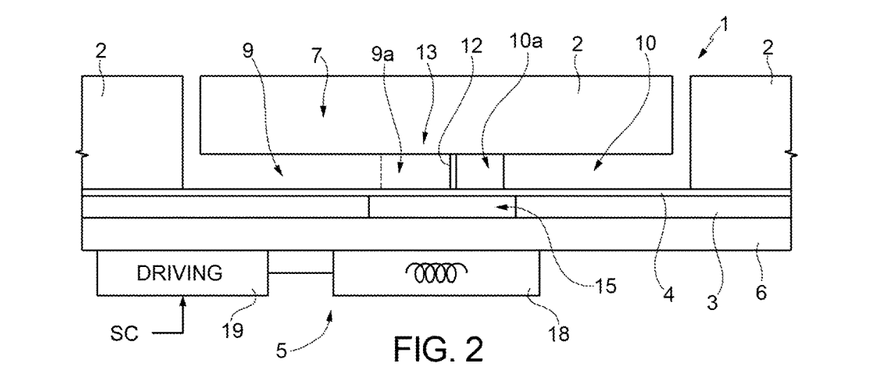
FIG. 2 a cross-sectional view of the microfluidic valve of FIG. 1 in a first operating configuration, taken along the line II-II of FIG. 1.

With reference to FIGS. 1 and 2, a microfluidic valve, designated as a whole by the number 1, comprises a first structural layer 2, a second structural layer 3, bonded to the first structural layer 2, a membrane 4 arranged between the first structural layer 2 and the second structural layer 3, and an actuator device 5. In one embodiment, the microfluidic valve 1 is housed on a supporting substrate 6, for example a glass, a plate of polymeric material, or a board for printed circuits.

The first structural layer 2 houses, in a superficial portion, a microfluidic circuit 7, which is at least in part delimited by the membrane 4. In greater detail, the first structural layer 2 is a plate of polymeric material, for example PDMS (polydimethyl siloxane), and the microfluidic circuit 7 is obtained by molding on a face of the first structural layer 2 designed in use to be bonded to the second structural layer 3. The first structural layer could in any case be made of a different material, such as glass, ceramic, or a semiconductor material.

The microfluidic circuit 7 comprises a first microfluidic conduit 9 and a second microfluidic conduit 10, set adjacent to one another in an active region 13 and separated by a wall 12 in the active region 13. In one embodiment, in particular, the first microfluidic conduit 9 is a channel having one end 9a bordering on the second microfluidic conduit 10. The wall 12 is U-shaped and surrounds the end 9a of the first microfluidic conduit 9, separating it from the second microfluidic conduit 10 in the active region 13.

One end 10a of the second microfluidic conduit 10 forms a chamber that surrounds the end 9a of the first microfluidic conduit 9 and the wall 12 in the active region 13.

The second structural layer 3 may be made of the same material used for the first structural layer 2 (PDMS) and has a recess 15 in a position corresponding to the active region 13. The recess 15 contains a gaseous fluid, for example air, and may be in fluidic communication with the outside or sealed by the membrane 4.

The first structural layer 2 and the second structural layer 3 are bonded to one another, and the membrane 4 is arranged between them. In particular, the membrane 4 extends at least in the active region 13, but may have larger dimensions, for example corresponding to the dimensions of the first structural layer 2 and of the second structural layer 3. In the active region 13, the membrane 4 delimits on one side the microfluidic circuit 7. Moreover, the membrane 4 separates the microfluidic circuit 7, in particular the end 9a, 10a of the first microfluidic conduit 9 and of the second microfluidic conduit 10, from the recess 15.

The membrane 4 is flexible and is also made of a polymeric material, in particular PDMS in one embodiment. The membrane 4, however, is added with particles of a magnetic material (in particular ferromagnetic or paramagnetic material) and consequently responds to the action of magnetic fields with a displacement conformable with the intensity of the applied magnetic field. In one embodiment, the membrane 4 contains particles of magnetized iron carbonyl.

Moreover, the particles of iron carbonyl have a diameter of approximately 5-8 μm, and the Fe-to-PDMS weight ratio is approximately 3:1.

The membrane 4 has a closed position and an open position, respectively in the absence and in the presence of an actuation stimulus, which in the example described is a magnetic field generated by the actuator device 5.

Here and in what follows, "absence" and "presence" of an actuation stimulus are to be understood in a broad sense. In particular, by "absence" of actuation stimulus is meant that the actuation stimulus is zero or less than a threshold corresponding to a force sufficient to bring the membrane 4 into the open position or keep it there. Instead, by "presence" of the actuation stimulus is meant that the actuation stimulus is higher than the threshold. Moreover, in a different embodiment the closed position and the open position may correspond, respectively, to the presence and to the absence of the actuation stimulus.

In the closed position (FIG. 2), the membrane 4 rests against the wall 12 throughout the active region 13 above the recess 15. Consequently, the membrane 4 and the wall 12 separate and fluidly decouple the first microfluidic conduit 9 from the second microfluidic conduit 10.

In the open position (FIG. 3), the membrane 4 is at least in part separated from the wall 12 and retracted into the recess 15. In this condition, the first microfluidic conduit 9 and the second microfluidic conduit 10 are fluidly coupled by a fluidic passage 17 defined between the membrane 4 and the wall 12.

Figure 3:
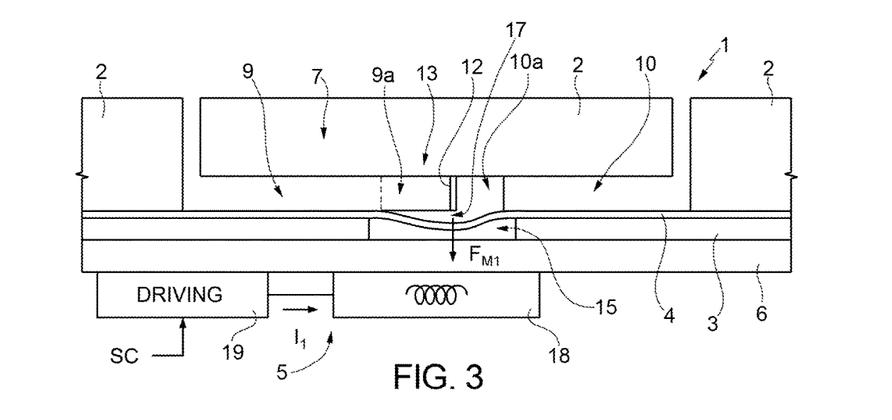
FIG. 3 shows the view of FIG. 2 in a second operating configuration.

Moreover, the membrane 4 opposes a resistance that maintains the condition of closing until the difference of pressure between the first microfluidic conduit 9 and the second microfluidic conduit 10 is less than an opening threshold. When the actuation stimulus is removed, the membrane 4 returns spontaneously into the closed position.

The actuator device 5 comprises a winding 18 and a driving circuit 19. In one embodiment, the winding 18 is arranged on a external face of the supporting substrate 6, in a position corresponding to the recess 15 and to the active region 13 of the microfluidic valve 1.

The driving circuit 19 is configured to supply a current $I_1$ to the winding 18 in response to a control signal $S_{C1}$, for example supplied by an external processing unit, not illustrated for simplicity herein. The current $I_1$ supplied to the winding 18 gives rise to a magnetic field and, consequently, a magnetic force $F_{M1}$ of intensity sufficient to bring the membrane 4 into the open position and keep it there.

In one embodiment, the driving circuit 19 is configured to supply to the winding 18 alternatively the current $I_1$, as already described, and a current $I_2$ (FIG. 4) of opposite sign (not necessarily of the same intensity), in response to a control signal $S_{C2}$.

Figure 4:
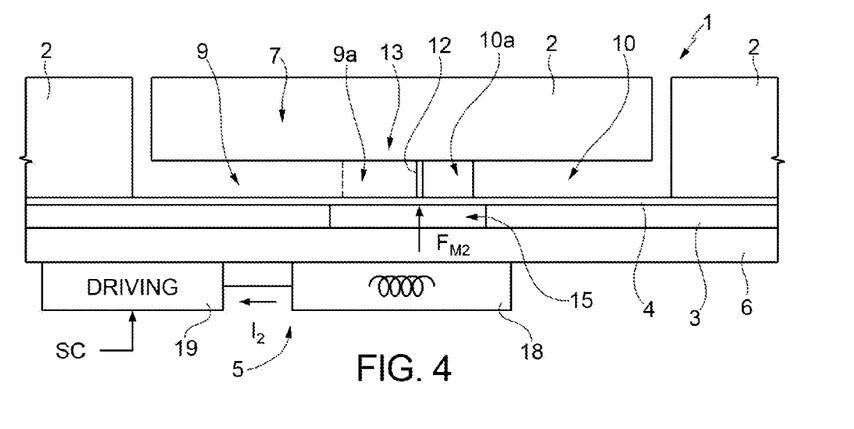
FIG. 4 shows the view of FIG. 2 in a third operating configuration.

When the winding 18 receives the current $I_2$, as a result of the magnetic field generated, the membrane 4 is subjected to a magnetic force $F_{M2}$ opposite to the magnetic force $F_{M1}$. The magnetic force $F_{M2}$ presses the membrane 4 against the edge of the wall 12 and favors closing of the microfluidic valve 1. The microfluidic valve 1 is hence able to counter differences in pressure between the first conduit 9 and the second conduit 10 that are greater as compared to the case where closing is caused by just the resistance of the membrane 4.

The microfluidic valve 1 enables a satisfactory fluidic seal and specifies actuation forces of modest intensity. Due to its structure, the microfluidic valve 1 can be easily integrated in microfluidic devices.

In addition, the microfluidic valve 1 may be produced in a simple way and at low costs, for example by the process described in what follows. The microfluidic circuit 7 is initially made in a superficial portion in the first structural layer 2. The microfluidic circuit 7 may be obtained during molding of the first structural layer 2 or else by milling, if the first structural layer 2 is made of polymeric material. Also photolithographic etching techniques may be used, for example if the first structural layer 2 is made of semiconductor material. At this point, the microfluidic circuit 7 is open on a face of the first structural layer 2 that is to be bonded to the second structural layer 3.

In one embodiment, the second structural layer 3 is machined, for example milled, to create the recess 15 and then bonded to the supporting substrate 6. The bonding material may be any suitable material, such as double-sided tape, glue, and paste. The recess 15 may be blind or else may pass through the second structural layer 3. In the latter case, the recess 15 is delimited on one side by the supporting substrate 6. The dimensions of the recess may be slightly greater than those of the chamber formed by the end 10a of the second microfluidic conduit 10.

The membrane 4, which is functionalized by incorporating particles of ferromagnetic material, is placed between the first structural layer 2 and the second structural layer 3, which are bonded to one another. The first structural layer 2 and the second structural layer 3 may be directly bonded to one another, with the membrane 4 that extends only over an area surrounding the active region 13. Alternatively, the membrane 4 may have larger dimensions, and the first structural layer 2 and the second structural layer 3 are bonded to opposite faces of the membrane 4 itself.

The process is simple, does not present critical steps, and thus also has a high yield. Due to the fact that the microfluidic circuit is in practice provided in the first structural layer 2, the alignment of the first structural layer 2 and of the second structural layer 3 does not present any difficulties.

Figure 5:
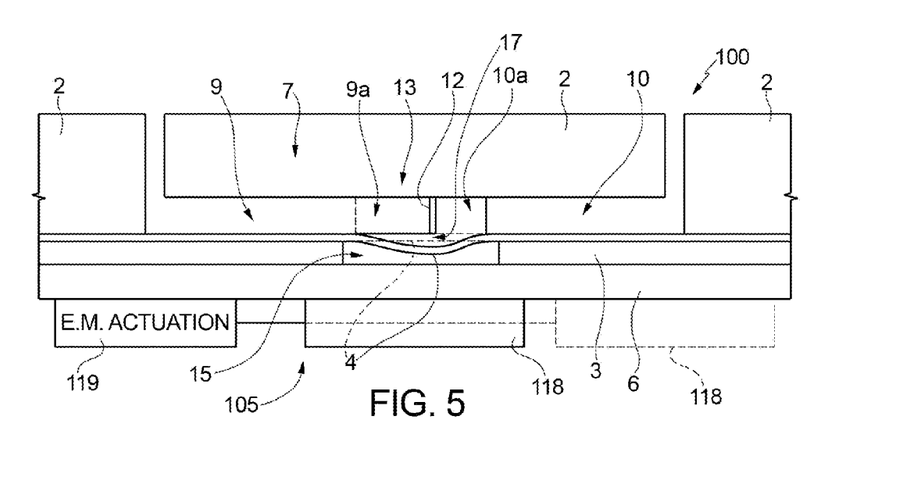
FIG. 5 is a cross-sectional view of a microfluidic valve according to a further embodiment of the present disclosure.

In a microfluidic valve 100 according to a different embodiment, illustrated in FIG. 5, the actuator device 5 is replaced by an actuator device 105, which comprises a permanent magnet 118 and an electromechanical drive 119.

The electromechanical drive 119 enables displacement of the magnet 118 between an inactive position and an active position.

The active position of the magnet 118 is a position corresponding to the recess 15 and to the active region 13. In the active position, the magnetic field generated by the magnet 118 acts on the membrane 4, which retracts into the recess 15 and enables fluidic connection between the first microfluidic conduit 9 and the second microfluidic conduit 10. Consequently, when the magnet 118 is in the active position, the microfluidic valve 100 is open. Instead, when the magnet 118 is in the inactive position, the force exerted on the membrane 4 as a result of the magnetic field is not sufficient to displace the membrane 4 itself towards the recess 15, and the microfluidic valve 100 is closed.

Figure 6:
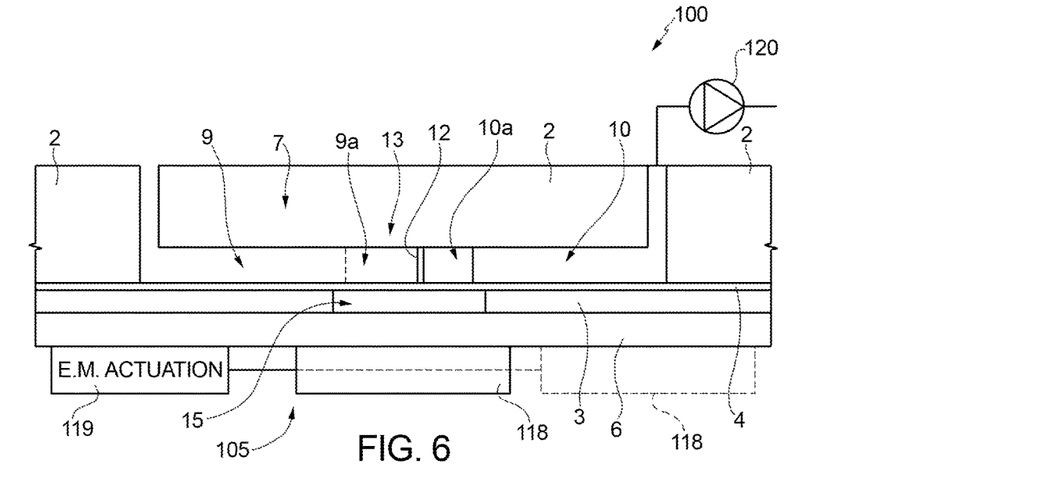
FIG. 6 is a cross-sectional view of a microfluidic valve according to a further embodiment of the present disclosure.

In FIG. 6, a suction micropump 120 is connected to one of the first microfluidic conduit 9 and the second microfluidic conduit 10, which functions as output of the microfluidic valve 100 (the second microfluidic conduit 10 in the example of FIG. 6). The micropump 120, when activated, creates a negative pressure within the second microfluidic channel 10 and, consequently, applies a suction force $F_A$ that tends to counter the action of the magnet 118, displacement of the membrane 4, and opening of the microfluidic valve 100. The micropump 120 may hence be used for modulating the opening threshold of the microfluidic valve 100 through the suction force $F_A$.

Figure 7:
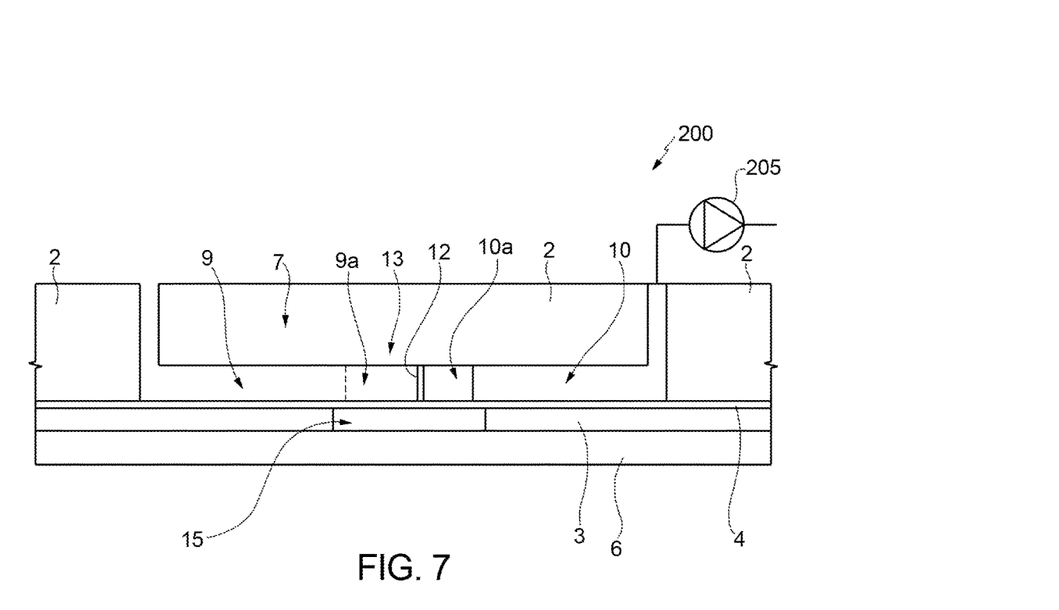
FIG. 7 is a cross-sectional view of a microfluidic valve according to a further embodiment of the present disclosure.

In the embodiment of FIG. 7, a microfluidic valve 200 comprises the first structural layer 2, the second structural layer 3, the membrane 4, and an actuator device 205.

The actuator device 205 is coupled to one of the first microfluidic conduit 9 and the second microfluidic conduit 10, which functions as inlet of the microfluidic valve 200, (the first microfluidic conduit 9 in the example of FIG. 7). The actuator device 205 is configured to generate in the first microfluidic conduit 9 an actuation pressure higher than the pressure in the second microfluidic conduit 10 and in the recess 15. The actuator device 205 may be controlled or else be of a passive type. In the former case, the actuator device 205 may comprise a micropump, configured to generate the actuation pressure in response to an electrical control signal supplied by a control unit (not illustrated). In the latter case, the actuator device 205 may comprise a reservoir for fluid collection, and the pressure due to the level of the fluid contained therein defines the actuation stimulus.

In the embodiment of FIG. 7, the membrane 4 does not require addition of ferromagnetic or paramagnetic material, and the microfluidic valve 200 functions as non-return valve. The microfluidic valve 200 may be obtained with the process already described, except for the fact that it is not necessary to functionalize the membrane 4 by incorporating magnetic material.

Figure 8:
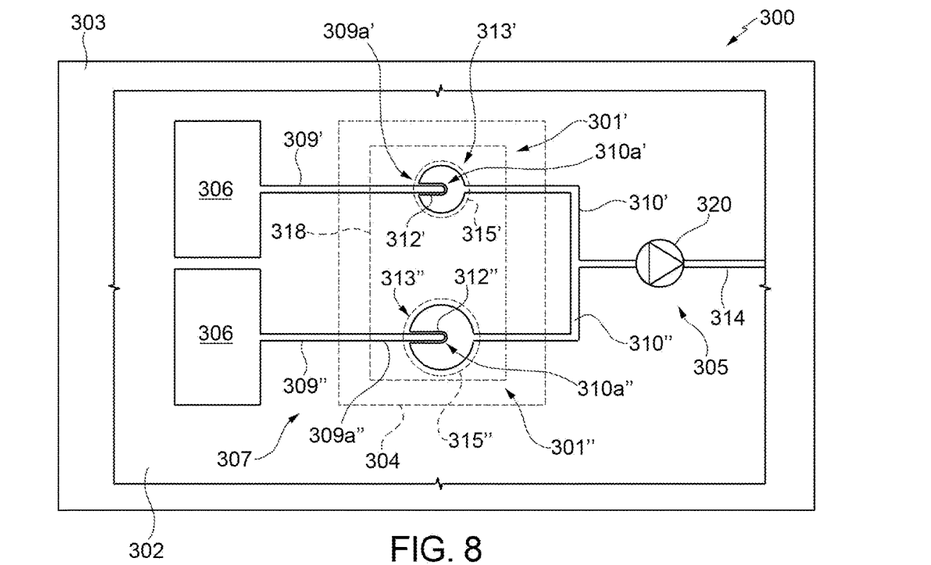
FIG. 8 is a top plan view, with parts removed for clarity, of a microfluidic valve according to a further embodiment of the present disclosure.

According to the embodiment illustrated in FIG. 8, a microfluidic device 300 comprises a first structural layer 302, a second structural layer 303, bonded to the first structural layer 303, a flexible membrane 304, arranged between the first structural layer 302 and the second structural layer 303, and an actuator device 305. The microfluidic device 300 incorporates a first microfluidic valve 301' and a second microfluidic valve 301".

The first structural layer 302 houses, in a superficial portion, a microfluidic circuit 307, which comprises a first microfluidic channel 309' and a second microfluidic channel 310' of the first microfluidic valve 301', a first microfluidic channel 309" and a second microfluidic channel 310" of the second microfluidic valve 301" and an outlet channel 314.

The first microfluidic conduit 309' of the first microfluidic valve 301' and the second microfluidic conduit 309" of the second microfluidic valve 301" have respective independent inlets, for example, connected to separate reservoirs 306.

In the first microfluidic valve 301', the first microfluidic conduit 309' and the second microfluidic conduit 310' are set adjacent to one another in an active region 313' and are separated by a wall 312' in the active region 313'. The first microfluidic conduit 309' has one end 309a' bordering on the second microfluidic conduit 310'. The wall 312' surrounds the end 309a' of the first microfluidic conduit 309', separating it from the second microfluidic conduit 310' in the active region 313'. One end 310a' of the second microfluidic conduit 310' forms a chamber that surrounds the end 309a' of the first microfluidic conduit 309' and the wall 312' in the active region 313'.

In the second microfluidic valve 301', the first microfluidic conduit 309" and the second microfluidic conduit 310" are set adjacent to one another in an active region 313" and are separated by a wall 312" in the active region 313". The first microfluidic conduit 309" has one end 309a" bordering on the second microfluidic conduit 310". The wall 312" surrounds the end 309a" of the first microfluidic conduit 309", separating it from the second microfluidic conduit 310" in the active region 313".

One end 310a" of the second microfluidic conduit 310" forms a chamber that surrounds the end 309a" of the first microfluidic conduit 309" and the wall 312" in the active region 313".

Moreover, the extent of the active region 313" and of the chamber formed by the end 310a" of the second microfluidic channel 310" is greater than the extent of the active region 313' and of the chamber formed by the end 310a' of the first microfluidic channel 310'.

The second structural layer 303 has a first recess 315' and a second recess 315", both containing a gaseous fluid and arranged in positions corresponding to the active region 313' and to the active region 313", respectively.

The first structural layer 302 and the second structural layer 303 are bonded to one another. The membrane 304 is made of polymeric material and contains particles of a ferromagnetic or paramagnetic material, for example magnetized particles of iron carbonyl. The membrane 304 is arranged between the first structural layer 302 and the second structural layer 303 and extends at least in the active region 313' and in the active region 313". Here, the membrane 304 delimits the microfluidic circuit 307 on one side, separating it from the recesses 315', 315". Moreover, the membrane 304 separates the recess 315' from the ends 309a', 310a' of the first microfluidic conduit 309' and of the second microfluidic conduit 310' of the first microfluidic valve 301' and the recess 315" from the ends 309a", 310a" of the first microfluidic conduit 309" and of the second microfluidic conduit 310" of the second microfluidic valve 301". In one embodiment (not illustrated), distinct membranes are present in the active regions 313', 313" to separate the microfluidic circuit 307 from the recesses 315', 315", instead of just the membrane 304, which extends continuously also in the region comprised between the recesses 315', 315".

The actuator device 305 comprises a permanent magnet 318, which extends in a position corresponding to the recesses 313', 313", and a suction micropump 320 connected to the second microfluidic conduits 310', 310" of the first microfluidic valve 301' and of the second microfluidic valve 301".

The magnet 318 is set in such a way as to cause displacement of the membrane 304 in the recesses 315', 315" in the absence of any action of suction on the part of the micropump 320.

The micropump 320, when activated, applies a controllable suction force to the membrane 304 in such a way as to cause closing of the first microfluidic valve 301' and of the second microfluidic valve 301". In greater detail, when the suction force is low, the micropump 320 is not able to counter the action of the magnet 318, and the microfluidic valves 301', 301" remain open. As the suction force exerted by the micropump 320 increases, the first microfluidic valve 301' closes, whilst the second microfluidic valve 301" remains open. The response of the membrane 304 is in fact determined, among other things, also by the extent of the active region 313' (of the recess 315') and of the active region 313" (of the recess 313"). The chamber defined by the end 310a' of the second conduit 310' of the first microfluidic valve 301' has dimensions smaller than the chamber defined by the end 310a" of the second conduit 310" of the second microfluidic valve 301". Consequently, the first valve 310' has a higher opening threshold, and to cause closing thereof a less intense action of the micropump 320 is sufficient than in the case of the second microfluidic valve 302".

If the suction force of the micropump 320 is increased further, also the second microfluidic valve 301" closes.

In practice, then, by acting on the suction force of the micropump 320, it is possible to control the state of the microfluidic valves 301', 301" and suck in controlled amounts of the fluids contained in the reservoirs 306.

Figure 9:
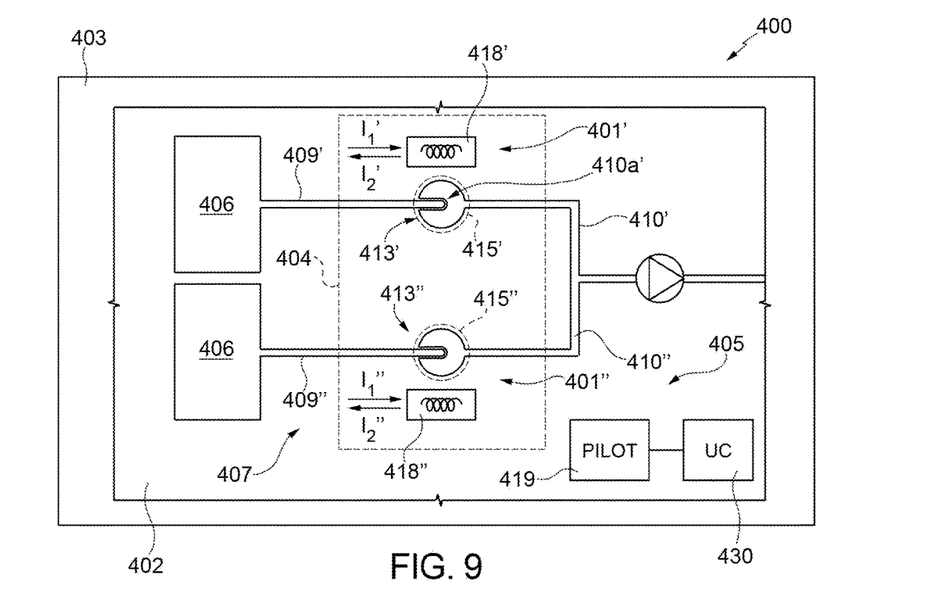
FIG. 9 is a top plan view, with parts removed for clarity, of a microfluidic valve according to a further embodiment of the present disclosure.

FIG. 9 shows a microfluidic device 400 that comprises a first structural layer 402, a second structural layer 403, bonded to the first structural layer 403, a flexible membrane 404, set between the first structural layer 402 and the second structural layer 403, and an actuator device 405. The microfluidic device 400 incorporates a first microfluidic valve 401' and a second microfluidic valve 401" having inlets coupled to respective reservoirs 406 and a common outlet. The valves 401', 401" substantially have the same structure as the valves 301', 301" of FIG. 8, except for the fact that the valves 401', 401" have the same dimensions.

Moreover, the microfluidic device 400 includes a control unit 430.

The membrane 404 is arranged between the first structural layer 402 and the second structural layer 403 and extends at least in the active region 413' and in the active region 413". Here, the membrane 404 delimits on one side the microfluidic circuit 407, separating it from the recesses 415', 415".

The actuator device 405 is governed by the control unit 430 and comprises a first winding 418', a second winding 418", and a driving circuit 419. The first winding 418' and the second winding 418" are arranged in positions correspondingly, respectively, to an active region 413' and a recess 415' of the first microfluidic valve 401' and to an active region 413" and a recess 415" of the second microfluidic valve 401". The driving circuit 419 is configured for supplying currents $I_1'$, $I_2'$ to the first winding 418' and currents $I_1''$, $I_2''$ to the second winding 418". The currents $I_1'$, $I_1''$ produce magnetic fields that cause displacement of the membrane 404 in the recesses 415', 415" and open the microfluidic valves 401', 402". Instead, the currents $I_2'$, $I_2''$, which have opposite sign with respect to the currents $I_1'$, $I_1''$, bring the membrane 404 into the closed position and close the microfluidic valves 401', 401".

Finally, it is evident that modifications and variations may be made to the microreactor and to the process described, without thereby departing from the scope of the present disclosure.

In particular, the shape of the wall that separates the ends of the first and second microfluidic conduits, as likewise the shape of the chamber at the end of the second microfluidic conduit may be chosen according to the specifications so as to obtain the response of the membrane and the opening threshold desired. For instance, the wall could have a triangular, rectangular, or trapezial shape, instead of being U-shaped. The chamber, as well as being circular, may be for example, elongated, square, or rectangular. In some embodiments, the chamber may be absent. In this case, the ends of the first and second microfluidic conduits are consecutive, and the wall may be simply rectilinear. Instead, the second microfluidic conduit may be defined entirely by a single chamber, having for example an outlet on the face of the first structural layer opposite to the membrane.

In the embodiments with magnetic or electromagnetic actuation, the position of the magnet and of the winding may be different from the ones described. For instance, the magnet and the winding may be adjacent to the face of the first structural layer opposite to the membrane.

The actuation stimulus may be defined by a magnetic force, by a suction force from the outlet of the microfluidic valve, by a force pressing on the inlet of the valve, and in general by a difference of pressure between the inlet and the outlet (in particular, between the first and second microfluidic conduits) or by a combination of the above quantities.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microfluidic valve, comprising:
  a substrate including a first surface and a second surface opposite to the first surface;
  a first layer of polymeric material;
  a second layer of polymeric material bonded to the first layer, the second layer arranged between the first layer and the first surface of the substrate;
  a microfluidic circuit, including:
    an active region;
    a first microfluidic conduit and a second microfluidic conduit that are defined in the first layer and are adjacent to each other in the active region;
    a chamber that is defined in the first layer, the chamber separating the first microfluidic conduit from the second microfluidic conduit, a portion of the first microfluidic conduit extending in to the chamber;
    a wall in the active region that separates the first microfluidic conduit from the chamber, the portion of the first microfluidic conduit being surrounded on at least two sides and an end by the wall, the wall being surrounded on at least two sides and an end by the chamber;
    a recess in the second layer in the active region, the recess including sidewalls formed by the second layer and a base formed by the first surface of the substrate; and a membrane arranged between the first layer and the second layer and delimiting a portion of the microfluidic circuit in the active region, the membrane being made of a polymeric material with particles of magnetic material, the membrane being moveable in response to an actuation stimulus between a closed position in which the first microfluidic conduit is fluidly decoupled from the second microfluidic conduit and an open position in which the membrane is at least in part retracted in the recess and places the first microfluidic conduit in fluid communication with the second microfluidic conduit, the actuation stimulus being a magnetic field;

a first channel formed in the first layer, the first channel placing the first microfluidic conduit of the microfluidic circuit in fluid communication with an environment outside of the first microfluidic conduit; and a second channel formed in the first layer, the second channel placing the second microfluidic conduit of the microfluidic circuit in fluid communication with an environment outside of the second microfluidic conduit, the first channel being separated from the second channel by the first and second microfluidic conduits, the membrane fluidly isolating the recess from the first microfluidic conduit, the second microfluidic conduit, and the chamber.

2. The microfluidic valve according to claim 1, wherein the first microfluidic conduit, the second microfluidic conduit, and the chamber are co-planar.

3. The microfluidic valve according to claim 1, wherein, in the closed position, the membrane rests against the wall.

4. The microfluidic valve according to claim 1, comprising an actuator device configured to provide the actuation stimulus, the actuator being positioned on the second surface of the substrate.

5. The microfluidic valve according to claim 4, wherein the actuator device comprises:
a winding in a position corresponding to the recess and to the active region; and
a driving device coupled to the winding.

6. The microfluidic valve according to claim 5, wherein the driving device is configured to supply a first current to the winding, wherein the first current in the winding generates a first magnetic field that causes the membrane to move into the open position.

7. The microfluidic valve according to claim 6, wherein the driving device is configured to supply a second current to the winding, wherein the second current in the winding generates a second magnetic field that causes the membrane to move into the closed position.

8. The microfluidic valve according to claim 5, wherein the actuator device comprises an electromechanical drive configured to move the magnetic material in the membrane between the open position and closed position, in which a force applied to the membrane by effect of the magnetic field generated is not sufficient to displace the membrane towards the recess.

9. The microfluidic valve according to claim 4, wherein the actuator device comprises a magnet in an active position corresponding to the recess and to the active region, the magnet configured to generate the magnetic field to retract the membrane into the recess.

10. The microfluidic valve according to claim 1, comprising a micropump coupled to one of the first microfluidic conduit and the second microfluidic conduit.

11. The microfluidic valve according to claim 1, wherein the wall is U-shaped and located between the first microfluidic conduit and the chamber.

12. The microfluidic valve according to claim 11, wherein the end of the portion of the first microfluidic conduit is inside an inner surface of the U-shaped wall and the chamber is around an outer surface of the U-shaped wall.

13. The microfluidic valve according to claim 1 wherein the chamber has a circular shape, and the portion of the first microfluidic conduit extends in to the chamber to at least to a center of the chamber.

14. A microfluidic device comprising:
a substrate;
a first layer of polymeric material;
a second layer of polymeric material, the second layer arranged between the substrate and the first layer; and
a microfluidic valve, including:
a first microfluidic conduit and a second microfluidic conduit in the first layer;
a chamber in the first layer, the chamber separating the first microfluidic conduit from the second microfluidic conduit, a portion of the first microfluidic conduit extending in to the chamber;
an opening in the second layer that forms a recess at a surface of the substrate, the recess including sidewalls formed by the second layer and a base formed by the substrate;
a membrane located between the first and second layers and over the opening, the membrane including polymeric material and particles of magnetic material, the membrane fluidly isolating the recess from the first microfluidic conduit, the second microfluidic conduit, and the chamber;
a wall located between the first microfluidic conduit and the chamber, the wall having an end that rests against the membrane, the wall and the membrane being configured to fluidly isolate the first microfluidic conduit from the chamber when the end of the wall rests against the membrane, the wall delimiting a convex shape of the portion of the first microfluidic conduit such that the portion of the first microfluidic conduit is surrounded on at least two sides and an end by the chamber, the wall being surrounded on at least two sides and an end by the chamber; and
an actuator device configured to apply a magnetic field to the membrane to cause the membrane to move away from the end of the wall and allow the first microfluidic conduit and the chamber to be in fluid communication with each other.

15. The microfluidic device according to claim 14, wherein the first microfluidic conduit, the second microfluidic conduit, and the chamber are co-planar.

16. The microfluidic device according to claim 14, comprising a control unit coupled to the actuator device and configured to control the actuator device.

17. A process comprising:
in a first layer of polymeric material, forming a first microfluidic conduit, a second microfluidic conduit, and a chamber that are adjacent to each other in a active region, the chamber separating the first microfluidic conduit from the second microfluidic conduit, a portion of the first microfluidic conduit extending in to the chamber, the first microfluidic conduit being separated from the chamber by a u-shaped wall in the active region such that the portion of the first microfluidic conduit is surrounded on at least two sides and an end by the wall, the wall being surrounded on at least two sides and an end by the chamber, the first layer having a first surface and a second surface that is opposite the first surface;

forming a first channel in the first layer, the first channel being in fluid communication with the first microfluidic conduit, the first channel extending through the first surface of the first layer;

forming a second channel in the first layer, the second channel being in fluid communication with the second microfluidic conduit, the second channel extending through the first surface of the first layer, the first channel being separated from the second channel by the first microfluidic conduit, the second microfluidic conduit, and the chamber;

forming a recess in a second layer of polymeric material;

placing a membrane between the second surface of the first layer and the second layer, the membrane including polymeric material and particles of magnetic material; and bonding the first layer to the second layer with the recess in a position corresponding to the active region, the membrane fluidly isolating the recess from the first microfluidic conduit, the second microfluidic conduit, and the chamber.

18. The process according to claim 17, wherein the first microfluidic conduit, the second microfluidic conduit, and the chamber are co-planar.

19. The process according to claim 17, wherein the wall in the active region delimits a convex region and a concave region, the convex region defining the end of the portion of the first microfluidic conduit, and the concave region defining the chamber.

20. The process according to claim 17, further comprising:

bonding the second layer to a printed circuit board.

* * * * *